United States Patent
Kaneko (10) Patent No.: US 11,468,555 B2
(45) Date of Patent: Oct. 11, 2022

(54) METHOD AND APPARATUS FOR GENERATING A CORRECTION LINE INDICATING RELATIONSHIP BETWEEN DEVIATION OF AN EDGE OF A WAFER PATTERN FROM AN EDGE OF A REFERENCE PATTERN AND SPACE WIDTH OF THE REFERENCE PATTERN, AND A COMPUTER-READABLE RECORDING MEDIUM

(71) Applicant: TASMIT, INC., Yokohama (JP)

(72) Inventor: Koji Kaneko, Yokohama (JP)

(73) Assignee: TASMIT, INC., Yokohama (JP)

( * ) Notice: Subject to any disclaimer, the term of this patent is extended or adjusted under 35 U.S.C. 154(b) by 84 days.

(21) Appl. No.: 17/041,405

(22) PCT Filed: Mar. 12, 2019

(86) PCT No.: PCT/JP2019/010046
§ 371 (c)(1),
(2) Date: Sep. 24, 2020

(87) PCT Pub. No.: WO2019/188258
PCT Pub. Date: Oct. 3, 2019

(65) Prior Publication Data
US 2021/0042901 A1 Feb. 11, 2021

(30) Foreign Application Priority Data
Mar. 30, 2018 (JP) .............................. JP2018-066405

(51) Int. Cl.
*G06T 7/00* (2017.01)
*G06T 7/13* (2017.01)
*G01N 23/2251* (2018.01)

(52) U.S. Cl.
CPC ......... *G06T 7/001* (2013.01); *G01N 23/2251* (2013.01); *G06T 7/13* (2017.01);
(Continued)

(58) Field of Classification Search
CPC ..... G01N 2223/401; G01N 2223/6116; G01N 2223/07; G01N 23/2251;
(Continued)

(56) References Cited

U.S. PATENT DOCUMENTS 6,868,175 B1 3/2005 Yamamoto et al.
7,817,844 B2 10/2010 Kitamura et al.
(Continued)

FOREIGN PATENT DOCUMENTS

JP 10-171097 A 6/1998
JP 3524853 5/2004
(Continued)

OTHER PUBLICATIONS

International Patent Application No. PCT/JP2019/010046; International Search Report and Written Opinion dated Jun. 4, 2019, 9 pgs.

*Primary Examiner* — Pinalben Patel
(74) *Attorney, Agent, or Firm* — Lathrop GPM LLP (57) ABSTRACT

A method of generating a correction line indicating a relationship between an amount of deviation of an edge of a wafer pattern from an edge of a reference pattern and a width of a space adjacent to the edge of the reference pattern, includes: creating an appearance-frequency graph of widths of spaces adjacent to reference patterns located within a designated area; obtaining images of wafer patterns corresponding to a plurality of space widths shown in the appearance-frequency graph; calculating amounts of deviation between edges of the wafer patterns on the images and edges of corresponding reference patterns; plotting a plurality of data points on a coordinate system, the plurality of data (Continued)

points being specified by the plurality of space widths and the amounts of deviation; and generating a correction line from the plurality of data points on the coordinate system.

2 Claims, 11 Drawing Sheets

(52) U.S. Cl.
CPC ... *G01N 2223/07* (2013.01); *G01N 2223/401* (2013.01); *G01N 2223/6116* (2013.01); *G06T 2207/10061* (2013.01); *G06T 2207/20072* (2013.01); *G06T 2207/30148* (2013.01)

(58) Field of Classification Search
CPC .......... G06T 2207/20072; G06T 7/001; G06T 2207/30148; G06T 7/13; G06T 2207/10061; G01B 15/04
See application file for complete search history.

(56) References Cited

U.S. PATENT DOCUMENTS

| | | |
|---|---|---|
| 2003/0046653 A1 | 3/2003 | Liu |
| 2003/0211398 A1 | 11/2003 | Lee et al. |
| 2012/0267528 A1* | 10/2012 | Sakai .................. G03F 7/70466 |
| | | 250/311 |
| 2014/0307945 A1 | 10/2014 | Yasui et al. |
| 2016/0247267 A1* | 8/2016 | Hashimoto ............. G06T 7/001 |
| 2017/0030706 A1* | 2/2017 | Natori ....................... G06T 7/60 |
| 2018/0005366 A1 | 1/2018 | Sato |

FOREIGN PATENT DOCUMENTS

| | | |
|---|---|---|
| JP | 4771714 | 9/2011 |
| JP | 2014-206466 A | 10/2014 |
| JP | 2015-59826 A | 3/2015 |
| JP | 2016-95332 A | 5/2016 |
| JP | 2017-26880 A | 2/2017 |
| JP | 2018-6746 A | 1/2018 |

* cited by examiner

— REFERENCE PATTERN
▨ ACTUAL WAFER PATTERN

METHOD AND APPARATUS FOR GENERATING A CORRECTION LINE INDICATING RELATIONSHIP BETWEEN DEVIATION OF AN EDGE OF A WAFER PATTERN FROM AN EDGE OF A REFERENCE PATTERN AND SPACE WIDTH OF THE REFERENCE PATTERN, AND A COMPUTER-READABLE RECORDING MEDIUM

CROSS-REFERENCE TO RELATED APPLICATIONS

This application is a 35 U.S.C. § 371 filing of International Application No. PCT/JP2019/010046 filed Mar. 12, 2019, which claims the benefit of priority to Japanese Patent Application No. 2018-066405 filed Mar. 30, 2018, each of which is incorporated herein by reference in its entirety.

TECHNICAL FIELD

The present invention relates to a technique used for detecting an edge of a pattern constituting a semiconductor integrated circuit (LSI) or a liquid crystal panel manufactured based on design data, and more particularly relates to a method and an apparatus for generating a correction line indicating a relationship between an amount of deviation of an edge of a wafer pattern from an edge of a reference pattern and a width of a space adjacent to the edge of the reference pattern.

BACKGROUND ART

Patent Document 1 provides a method of comparing a pattern transferred to a wafer with a reference pattern created from design data and measuring the shape of the pattern or detecting a defect of the pattern. The reference pattern is expressed by line segments or curved lines, and is compared with an inspection target image (i.e., a wafer pattern). Scaling and line width-offset are uniformly applied in advance to the reference pattern in accordance with the wafer pattern, and a corner rounding process is applied for matching with the wafer pattern or detecting an edge. This method is called die-to-database inspection and has already been implemented. The die-to-database inspection searches for an edge of a wafer pattern based on the edge of the reference pattern. Therefore, it is important that the wafer pattern, to be measured, does not differ significantly from the reference pattern.

However, in practice, the edge of the wafer pattern may be greatly deviated from the edge of the reference pattern under influence of processes, such as photolithography and dry etching.

If the edge of the wafer pattern is largely deviated from the edge of the reference pattern, the edge of the wafer pattern may not be searched properly. Moreover, a misalignment may occur in a pattern matching process between the reference pattern and the wafer pattern. When such erroneous detection of the pattern edge or the misalignment of pattern matching occurs, a pattern defect cannot be properly detected, or a large number of pseudo defects may occur. In the pattern shape measurement, a more serious problem nay occurs than the defect inspection described above. Specifically, the pattern shape measurement may fail even though the pattern is resolved, or an erroneous measurement value may be mixed.

One solution is to simply expand a search range for the pattern edge uniformly. However, such solution may be likely to cause erroneous detection of an adjacent pattern edge. Algorithm for accurately detecting all edges, including those with large deviations, is complex and entails computational costs, thus causing a potential problem in a throughput. In addition, it is necessary to check whether the algorithm and set values are optimal for each sample. This verification is usually a time-consuming work. An engineer who performs this verification needs to be familiar with the edge search algorithm, and this can result in craftsmanship that can only be conducted by some trained engineers.

CITATION LIST

Patent Literature

Patent document 1: Japanese Patent No. 3524853
Patent document 2: Japanese Patent No. 4771714

SUMMARY OF INVENTION

Technical Problem

The amount of deviation between the edge of the wafer pattern and the edge of the reference pattern is expected to have various trends depending on manufacturing process and design rules, and it is therefore difficult to find a uniform correction method. Accordingly, it is important to accurately grasp the tendency of the amount of deviation between the edge of the wafer pattern and the edge of the reference pattern. In order to measure the amount of deviation, it is necessary to correctly detect the edge of the wafer pattern. However, in a portion where the amount of deviation is large, the edge cannot be properly detected if the reference pattern is used as it is.

Thus, the present invention provides a method and an apparatus that can accurately and quickly determine a correlation of an amount of deviation between an edge of a wafer pattern and an edge of a reference pattern.

Solution to Problem

In an embodiment, there is provided a method of generating a correction line indicating a relationship between an amount of deviation of an edge of a wafer pattern from an edge of a reference pattern and a width of a space adjacent to the edge of the reference pattern, comprising: creating an appearance-frequency graph with respect to widths of spaces adjacent to reference patterns located within a designated area; obtaining images of wafer patterns corresponding to a plurality of space widths shown in the appearance-frequency graph; calculating amounts of deviation between edges of the wafer patterns on the images and edges of corresponding reference patterns; plotting a plurality of data points on a coordinate system, the plurality of data points being specified by the plurality of space widths and the amounts of deviation; and generating a correction line from the plurality of data points on the coordinate system.

In an embodiment, the plurality of data points comprises a plurality of temporary data points, and the method further comprises: plotting a new data point on the coordinate system; and updating the correction line from the plurality of temporary data points and the new data point.

In an embodiment, plotting the new data point on the coordinate system comprises: obtaining an image of an additional wafer pattern corresponding to at least one additional space width shown in the appearance-frequency graph; correcting a position of an edge of a reference pattern corresponding to the additional wafer pattern using the correction line; detecting an edge of the additional wafer pattern on the image based on the reference pattern whose position of the edge has been corrected; calculating an amount of deviation between the detected edge and the edge of the reference pattern before the correction; and plotting the new data point on the coordinate system, the new data point being specified by the additional space width and the amount of deviation of the detected edge.

In an embodiment, the method further comprises repeating plotting of the new data point on the coordinate system and updating of the correction line.

In an embodiment, there is provided an apparatus for generating a correction line indicating a relationship between an amount of deviation of an edge of a wafer pattern from an edge of a reference pattern and a width of a space adjacent to the edge of the reference pattern, the apparatus being configured to: create an appearance-frequency graph with respect to widths of spaces adjacent to reference patterns located within a designated area; obtain images of wafer patterns corresponding to a plurality of space widths shown in the appearance-frequency graph; calculate amounts of deviation between edges of the wafer patterns on the images and edges of corresponding reference patterns; plot a plurality of data points on a coordinate system, the plurality of data points being specified by the plurality of space widths and the amounts of deviation; and generate a correction line from the plurality of data points on the coordinate system.

In an embodiment, the plurality of data points comprises a plurality of temporary data points, and the apparatus is further configured to: plot a new data point on the coordinate system; and update the correction line from the plurality of temporary data points and the new data point.

In an embodiment, the operation of plotting the new data point on the coordinate system comprises: an operation of obtaining an image of an additional wafer pattern corresponding to at least one additional space width shown in the appearance-frequency graph; an operation of correcting a position of an edge of a reference pattern corresponding to the additional wafer pattern using the correction line; an operation of detecting an edge of the additional wafer pattern on the image based on the reference pattern whose position of the edge has been corrected; an operation of calculating an amount of deviation between the detected edge and the edge of the reference pattern before the correction; and an operation of plotting the new data point on the coordinate system, the new data point being specified by the additional space width and the amount of deviation of the detected edge.

In an embodiment, the apparatus is configured to repeat the operation of plotting the new data point on the coordinate system and the operation of updating the correction line.

In an embodiment, there is provided a non-transitory computer-readable storage medium storing a program for causing a computer to perform the steps of: creating an appearance-frequency graph with respect to widths of spaces adjacent to reference patterns located within a designated area; obtaining images of wafer patterns corresponding to a plurality of space widths shown in the appearance-frequency graph; calculating amounts of deviation between edges of the wafer patterns on the images and edges of corresponding reference patterns; plotting a plurality of data points on a coordinate system, the plurality of data points being specified by the plurality of space widths and the amounts of deviation; and generating a correction line from the plurality of data points on the coordinate system.

Advantageous Effects of Invention

According to the present invention, it is possible to easily and quickly generate the correction line indicating the relationship between the amount of deviation of the edge of the wafer pattern from the edge of the reference pattern and the space width.

DESCRIPTION OF EMBODIMENTS

Hereinafter, embodiments of the present invention will be described with reference to the drawings.

Figure 1:
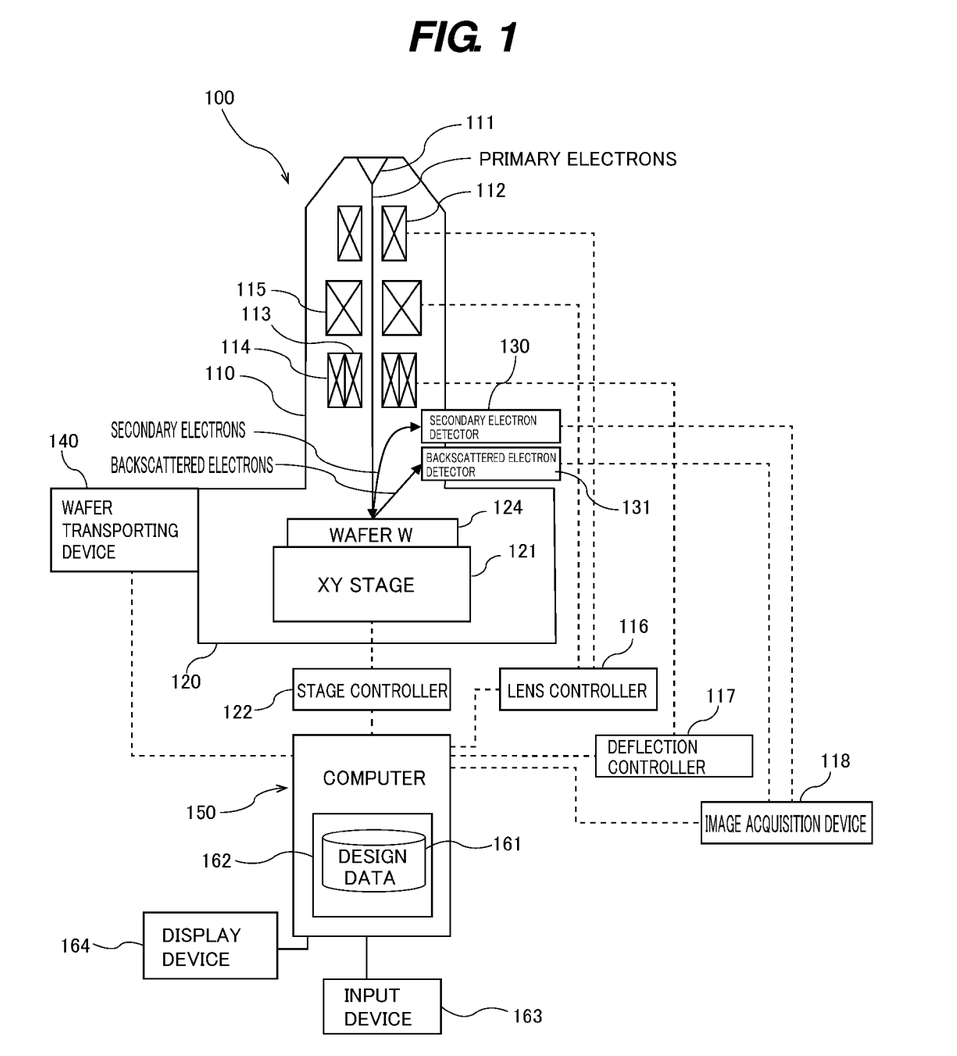
FIG. 1 is a schematic diagram illustrating an embodiment of an image generation system including a scanning electron microscope.

FIG. 1 is a schematic diagram showing an embodiment of an image generation system including a scanning electron microscope. As shown in FIG. 1, the image generation system includes a scanning electron microscope 100 and a computer 150 that controls the operations of the scanning electron microscope. The scanning electron microscope 100 includes an electron gun 111 configured to emit an electron beam composed of primary electrons (or charged particles), a converging lens 112 for converging the electron beam emitted by the electron gun 111, an X deflector 113 for deflecting the electron beam in an X direction, a Y deflector 114 for deflecting the electron beam in a Y direction, and an objective lens 115 for focusing the electron beam on a wafer 124 which is a specimen.

The converging lens 112 and the objective lens 115 are coupled to a lens controller 116, so that the operations of the converging lens 112 and the objective lens 115 are controlled by the lens controller 116. The lens controller 116 is coupled to the computer 150. The X deflector 113 and the Y deflector 114 are coupled to a deflection controller 117, so that the deflecting operations of the X deflector 113 and the Y deflector 114 are controlled by the deflection controller 117. This deflection controller 117 is also coupled to the computer 150. A secondary electron detector 130 and a backscattered electron detector 131 are coupled to an image acquisition device 118. The image acquisition device 118 is configured to convert output signals of the secondary electron detector 130 and the backscattered electron detector 131 into images. This image acquisition device 118 is also coupled to the computer 150.

An XY stage 121 arranged in a specimen chamber 120 is coupled to a stage controller 122, so that the position of the XY stage 121 is controlled by the stage controller 122. The stage controller 122 is coupled to the computer 150. A wafer transporting device 140 for transporting the wafer 124 onto the XY stage 121 in the specimen chamber 120 is also coupled to the computer 150. The computer 150 includes a memory 162 in which a design database 161 is stored, an input device 163 such as a keyboard and a mouse, and a display device 164 having a screen for displaying an image and a graphical user interface (GUI).

The electron beam emitted by the electron gun 111 is converged by the converging lens 112, and is then focused on the surface of the wafer 124 by the objective lens 115, while the electron beam is deflected by the X deflector 113 and the Y deflector 114. When the wafer 124 is irradiated with the primary electrons of the electron beam, secondary electrons and backscattered electrons are emitted from the wafer 124. The secondary electrons are detected by the secondary electron detector 130, and the backscattered electrons are detected by the backscattered electron detector 131. The detected signals of the secondary electrons and the signals of the backscattered electrons are input to the image acquisition device 118 and converted into image data. The image data is transmitted to the computer 150, and an image of the wafer 124 is displayed on the display device 164 of the computer 150.

Design data (including design information, such as pattern dimensions) for the wafer 124 is stored in advance in the memory 162. In the memory 162, a design database 161 is constructed. The design data for the wafer 124 is stored in the design database 161 in advance. The computer 150 can read out the design data for the wafer 124 from the design database 161 stored in the memory 162.

The pattern of the wafer 124 is produced based on the design data stored in the design database 161. When an edge of the pattern of the wafer 124 is to be detected from the image of the wafer 124, a reference pattern generated from the design data is used. The reference pattern is generated by uniformly scaling the design data and applying a line-width offset to the design data in advance in order to conform with the wafer pattern. In addition, a corner rounding process is applied to the design data. Therefore, ideally, the pattern of the wafer 124 coincides with the reference pattern. However, as described above, the edge of the pattern of the wafer 124 may be greatly deviated from the edge of the reference pattern due to the influence of processes, such as photolithography and dry etching.

Figure 2:
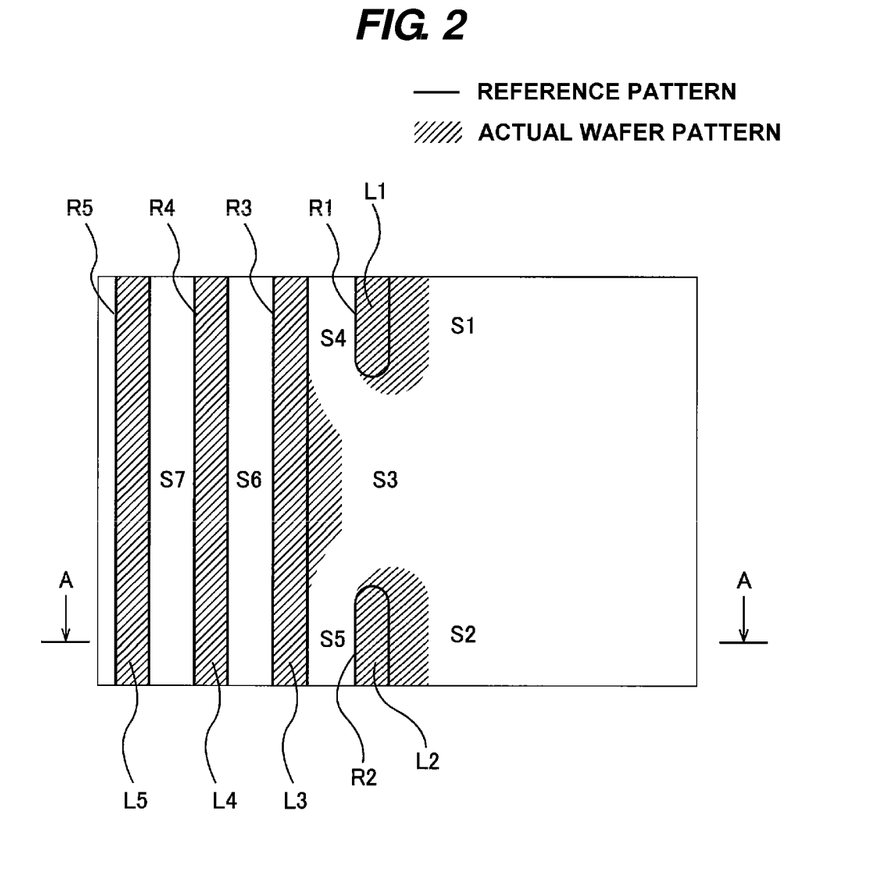
FIG. 2 is a schematic diagram showing line patterns of a wafer observed by the scanning electron microscope (SEM) and corresponding reference patterns.

FIG. 2 is a schematic diagram showing line patterns of a wafer observed by the scanning electron microscope (SEM) and corresponding reference patterns. In FIG. 2, symbols L1, L2, L3, L4, and L5 represent actual line patterns formed on the wafer, and symbols R1, R2, R3, R4, and R5 represent reference patterns corresponding to the line patterns L1, L2, L3, L4, and L5, respectively. Symbols S1, S2, S3, S4, S5, S6, and S7 represent spaces.

In the example shown in FIG. 2, wide spaces S1 and S2 are adjacent to right sides of the two reference patterns R1 and R2 located at an upper region and a lower region. Edges of the line patterns L1 and L2 expand to the right due to the adjacent wide spaces S1 and S2. Similarly, a wide space S3 is adjacent to the right side of the central portion of the reference pattern R3, and a central portion of an edge of the line pattern L3 expands to the right due to the adjacent wide space S3. Such phenomena are called microloading effect in reactive ion etching.

Figure 3:
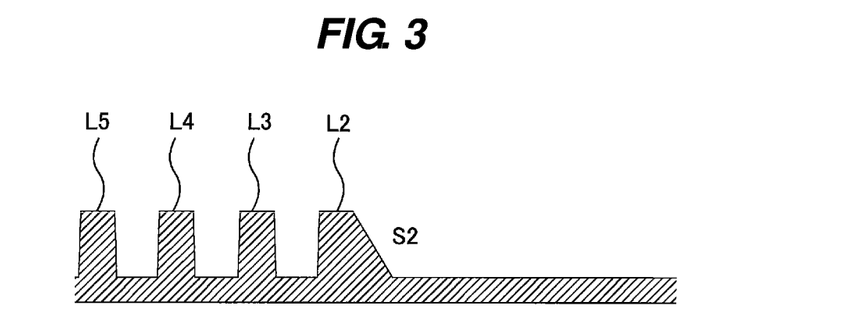
FIG. 3 is a cross-sectional view taken along line A-A of FIG. 2.
Figure 4:
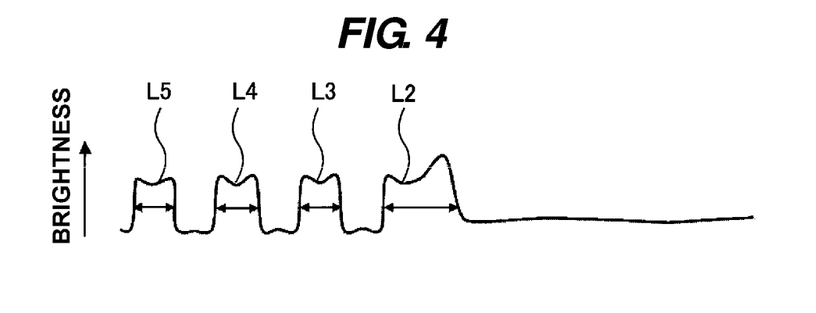
FIG. 4 is a diagram showing brightness in an SEM image of the wafer pattern shown in FIG. 3.

FIG. 3 is a cross-sectional view taken along line A-A of FIG. 2. A right-side wall of the line pattern L2 is inclined outwardly toward its bottom. FIG. 4 is a diagram showing brightness in an SEM image of the wafer patterns of FIG. 3. When the SEM image is generated, a large amount of secondary electrons is emitted from the inclined side wall of the line pattern L2. As a result, the brightness of the inclined side wall increases. In general, in line-width measurement or shape observation using a scanning electron microscope (SEM), a high brightness portion is determined to be a pattern, and a low brightness portion is determined to be a space (a portion with no pattern). For this reason, the line pattern L2 is recognized as a line pattern having the same overall width as the bottom width. Such a problem can occur not only in the line pattern but also in a hole pattern and an island pattern.

Figure 5:
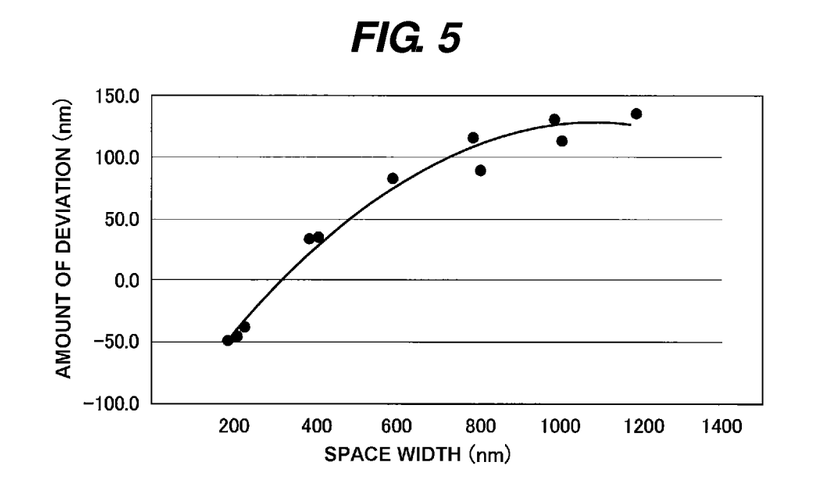
FIG. 5 is a graph showing an example of a relationship between an amount of deviation of an edge of a wafer pattern from an edge of a reference pattern and a width of a space adjacent to the edge of the reference pattern.

FIG. 5 is a graph showing an example of a relationship between an amount of deviation of the edge of the wafer pattern from the edge of the reference pattern and the width of the space adjacent to the edge of the reference pattern. Hereinafter, the width of the space adjacent to the edge of the reference pattern may be simply referred to as space width. Examples of the space width include the widths of the spaces S1, S2, S3, S4, S5, S6, and S7 shown in FIG. 2. Vertical axis in FIG. 5 represents amount of deviation between edge of metal-interconnect wafer pattern and edge of reference pattern. As can be seen from FIG. 5, there is a correlation between the amount of deviation of the edge of the wafer pattern and the width of the space adjacent to the edge of the corresponding reference pattern. In the example shown in FIG. 5, the correlation is represented by a curved line. Specifically, when the space width is in a range of 200 nm to 1000 nm, the deviation increases according to the space width, and when the space width exceeds 1000 nm, the deviation hardly changes. In many cases, the actual correlation is expected to be represented by a curved line instead of a straight line.

In the present embodiment, the computer 150 determines a correction line indicating the correlation between the amount of deviation and the space width, stores the correction line in the memory 162, and corrects the position of the edge of the reference pattern using the correction line, and detects the edge of the pattern on the wafer with use of the reference pattern whose edge position has been corrected. An embodiment of a method of generating the correction line indicating the relationship between the amount of deviation and the space width and correcting the edge position of the reference pattern using the correction line will be described below.

Figure 6:
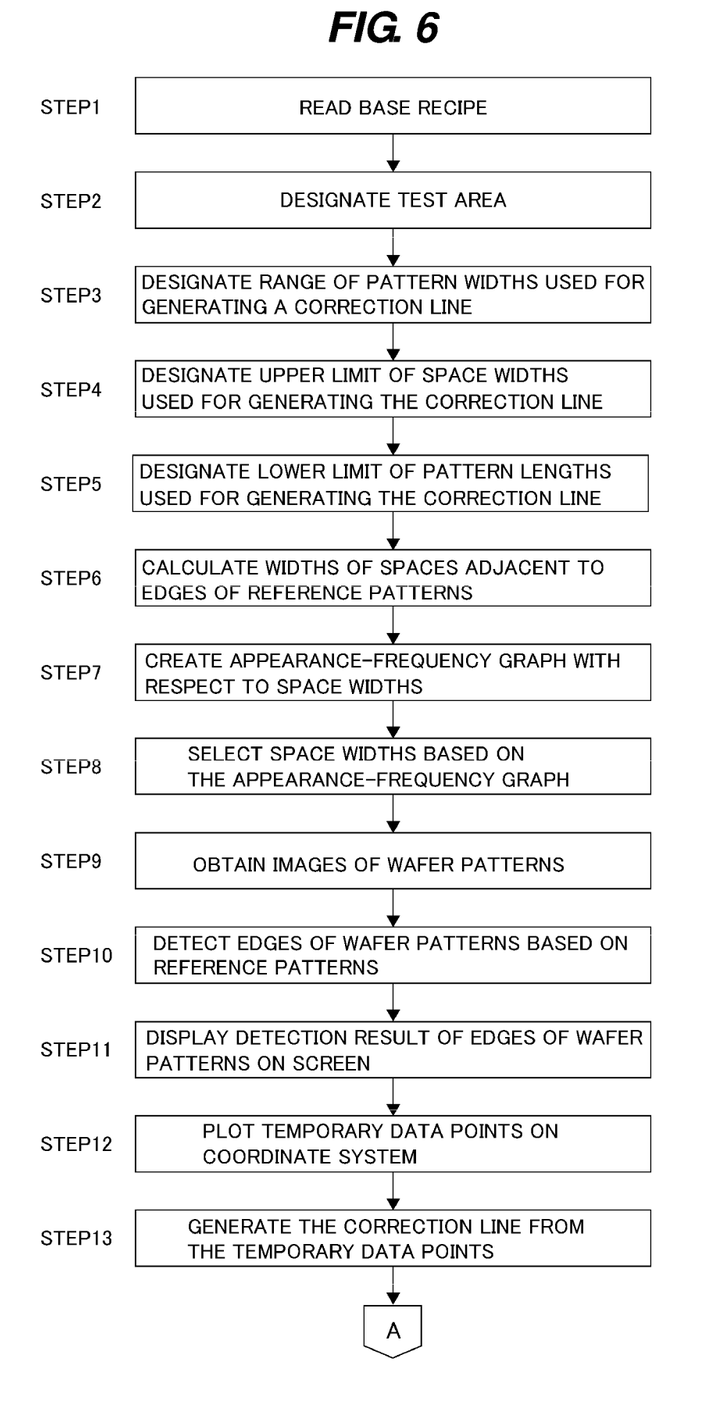
FIG. 6 is a first half of a flowchart illustrating an embodiment of a method of generating a correction line indicating the relationship between the amount of deviation and the space width.
Figure 7:
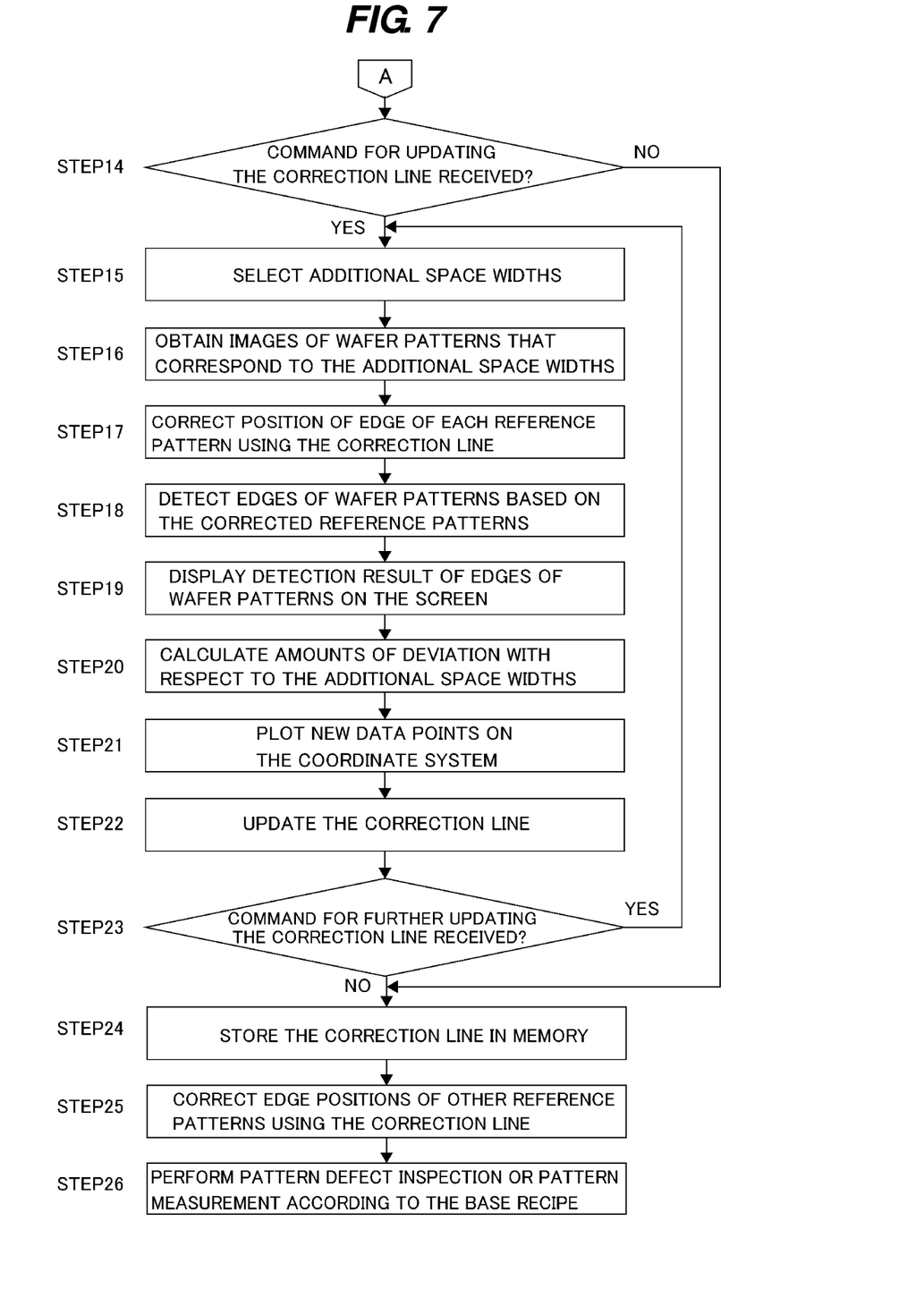
FIG. 7 is a second half of the flowchart illustrating the embodiment of the method of generating the correction line indicating the relationship between the amount of deviation and the space width.

FIG. 6 and FIG. 7 are flowcharts illustrating an embodiment of a method of generating the correction line indicating the relationship between the amount of deviation and the space width and correcting the edge position of the reference pattern using the correction line. In step 1, the computer 150 reads out a base recipe. The base recipe is a file that records parameter settings for performing pattern defect inspection and pattern measurement using a typical die-to-database method. The base recipe contains information on an area where inspection and measurement are conducted. This area is determined by a user.

In step 2, a test area for calculating space widths used for generating the correction line is designated. This test area is set so as to include all pattern types in an area where the inspection and measurement, specified by the base recipe, are performed. Portions that do not affect the pattern type, such as repetitive patterns, are excluded. Such minimizing the test area makes it possible to reduce a time required to create an appearance-frequency graph representing appearance frequency of space widths, which will be discussed later.

In step 3, a range of widths of patterns used for generating the correction line is designated. Patterns having widths outside the specified range are not used for generating the correction line. Usually, thin patterns and thin spaces close to the design rules are liable to have defects (e.g., short circuits, disconnections, dimensional abnormalities), and are subject to pattern-defect inspection and pattern measurement. On the other hand, patterns having large widths rarely have defects (e.g., short circuits, disconnections, dimensional abnormalities) that affect a performance of a semiconductor. Therefore, such patterns with large widths are not usually subjected to the inspection and the measurement. Excluding patterns having such widths can make it possible to reduce a time required to create an appearance-frequency graph of space widths described later.

In step 4, an upper limit of space widths used for generating the correction line is designated. As shown in FIG. 5, when the space width increases to some extent, the amount of deviation hardly changes. Therefore, a value, which is two to three times the space width at which the amount of deviation is not expected to change, is designated as the upper limit of space widths. However, the space width at which the amount of deviation does not change is unknown until amounts of deviation are calculated. Accordingly, the upper limit of space widths is designated with a margin.

In step 5, a lower limit of lengths of patterns used for generating the correction line is designated. Usually, an influence of a width of an adjacent space changes in a curve with a length of about 50 nm to 200 nm. Since short patterns may be in the middle of the change, such short patterns are excluded.

In step 6, the computer 150 reads out the design data that has been used to form the wafer pattern from the design database 161, and uses the design data to calculate widths of a plurality of spaces adjacent to edges of all reference patterns which satisfy the conditions designated in the steps 2 to 5. The reference patterns used for calculating the space widths are reference patterns existing in the test area designated in the step 2 discussed above. The computer 150 stores data of the plurality of calculated space widths in the memory 162. In the calculation of the space widths in the step 6, straight edges of the reference patterns before the corner rounding process is applied may be used, or straight edges of the reference patterns after the corner rounding process is applied may be used.

Figure 8:
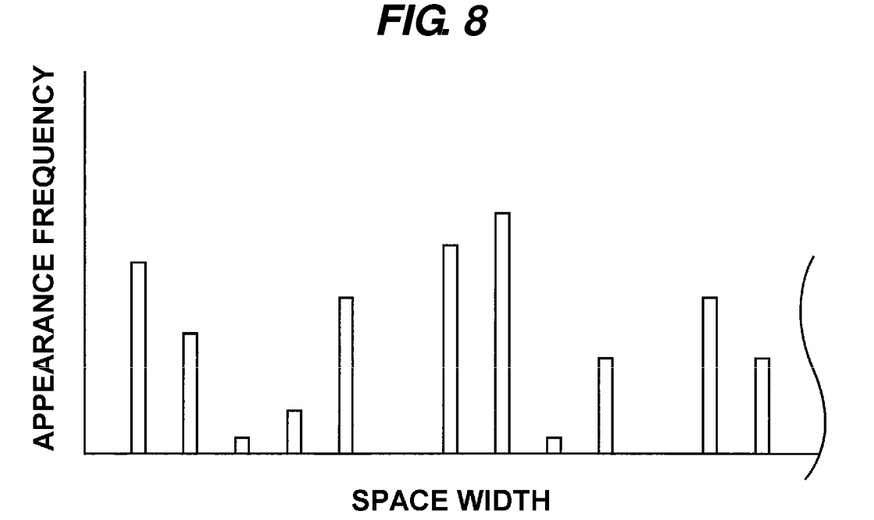
FIG. 8 is a diagram showing an example of an appearance-frequency graph with respect to the space width.

In step 7, the computer 150 creates an appearance-frequency graph with respect to space widths using the data of the plurality of space widths calculated in the step 6. FIG. 8 shows an example of the appearance-frequency graph with respect to space widths. Vertical axis in FIG. 8 represents appearance frequency of space width, and horizontal axis represents space width.

The computer 150 sets a plurality of temporary data points based on the appearance-frequency graph. Specific operations are as follows. In step 8, at least two space widths are selected based on the appearance-frequency graph of FIG. 8. Each of the selected space widths is one of the plurality of space widths shown in the appearance-frequency graph, and the appearance frequencies of these selected space widths are high to some degree. For example, space widths whose appearance frequencies are higher than a threshold value are selected. The space widths selected in the step 8 include at least a temporary minimum value of space widths and a temporary maximum value of space widths. It is preferable that one or more space widths including intermediate value(s) between the temporary minimum value and the temporary maximum value be additionally selected. The purpose of designating the temporary maximum value is to specify a point at which the amount of deviation does not change. If the correction line produced in below-described steps is linear, a space width larger than the temporary maximum value is added. However, if a linear correction line is expected and allowable, the space widths to be selected may be only the temporary minimum value and the temporary maximum value.

In step 9, the computer 150 selects, from the test area, a plurality of wafer patterns corresponding respectively to the plurality of space widths selected in the step 8. The computer 150 instructs the scanning electron microscope 100 to generate images of the plurality of wafer patterns selected. The number of images generated is the same as the number of selected space widths. For example, if three space widths are selected in the above step 8, any three wafer patterns corresponding to the respective space widths are selected from within the test area, and three images of these three wafer patterns are generated by the scanning electron microscope 100. The computer 150 obtains the images of the wafer patterns from the scanning electron microscope 100.

In step 10, the computer 150 detects edges of the wafer patterns on the images, obtained in the step 9, based on corresponding reference patterns. This edge detection is a process of searching for edges of the wafer patterns corresponding to respective edges of the reference patterns.

In step 11, the computer 150 displays the detection result of the edges of the wafer patterns on the screen of the display device 164.

In the above-described step 10, detection of the edge corresponding to the selected space width in a normal way according to the base recipe may fail. In such a case, the computer 150 may search for an edge of the wafer pattern while gradually moving the edge of the reference pattern. Alternatively, in order to achieve the edge detection in a shorter time, the user may manipulate the graphical user interface (GUI) of the computer 150 so as to move the edge of the reference pattern on the screen until it coincides with the edge of the wafer pattern. For example, the user may manipulate the mouse of the computer 150 to drag the edge of the reference pattern until it coincides with the edge of the wafer pattern. In this case, the moving distance of the edge of the reference pattern corresponds to the amount of deviation between the edge of the wafer pattern and the edge of the reference pattern. Therefore, the computer 150 can calculate the amount of deviation from the moving distance of the edge of the reference pattern.

Figure 9:
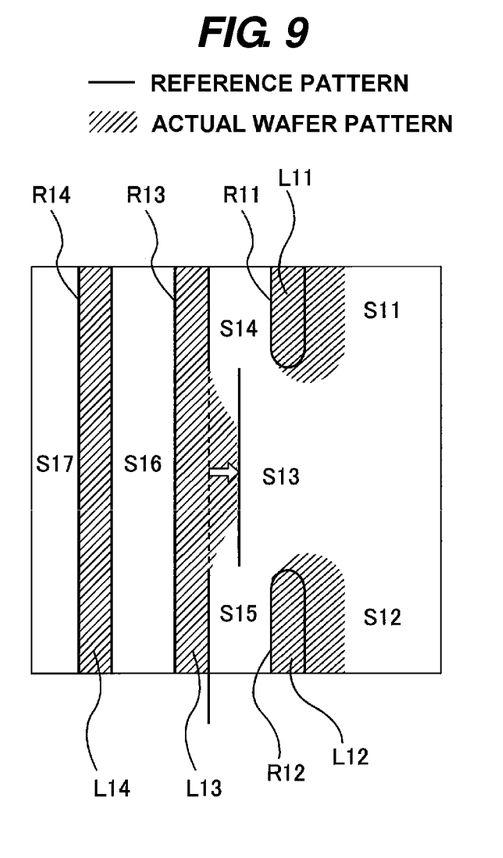
FIG. 9 is a schematic view showing a process of moving an edge of the reference pattern on GUI.

FIG. 9 is a schematic diagram showing a process of moving the edge of the reference pattern on the computer 150. In FIG. 9, symbols L11, L12, L13, and L14 represent wafer patterns, symbols R11, R12, R13, and R14 represent reference patterns corresponding to the wafer patterns L11, L12, L13, and L14, respectively, and symbols S11, S12, S13, S14, S15, S16, and S17 represent spaces. In the example shown in FIG. 9, an edge of the reference pattern R13 corresponding to the space S13 has been moved.

In step 12, the computer 150 calculates amounts of the deviation with respect to the space widths selected in the step 8 based on the positions of the edges of the wafer patterns and the positions of the edges of the corresponding reference patterns, and plots a plurality of temporary data points on a coordinate system. The plurality of temporary data points are specified by the calculated amounts of deviation and the selected space widths. The amounts of deviation correspond to distances between the edge positions of the wafer patterns and the edge positions of the corresponding reference patterns.

Figure 10:
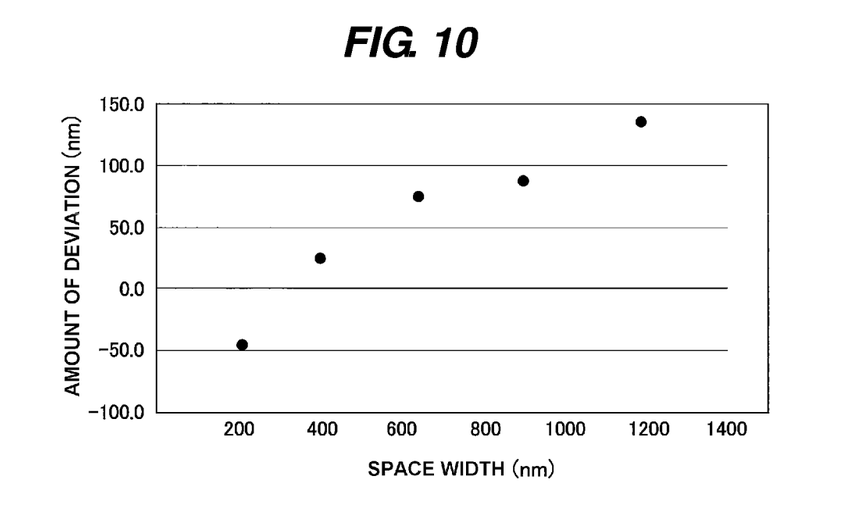
FIG. 10 is a graph showing temporary data points plotted on a coordinate system.

FIG. 10 is a graph showing the temporary data points plotted on the coordinate system. Vertical axis in FIG. 10 represents the amount of deviation, and horizontal axis represents the space width. The coordinate system has the vertical axis representing the amount of deviation and the horizontal axis representing the space width. In one embodiment, the coordinate system may have a vertical axis representing the space width and a horizontal axis representing the amount of deviation. Each temporary data point, indicated by a black circle in FIG. 10, is specified by a numerical value of the amount of deviation and a numerical value of the space width. In the example shown in FIG. 10, five space widths are selected, and five corresponding temporary data points are plotted on the coordinate system.

Figure 11:
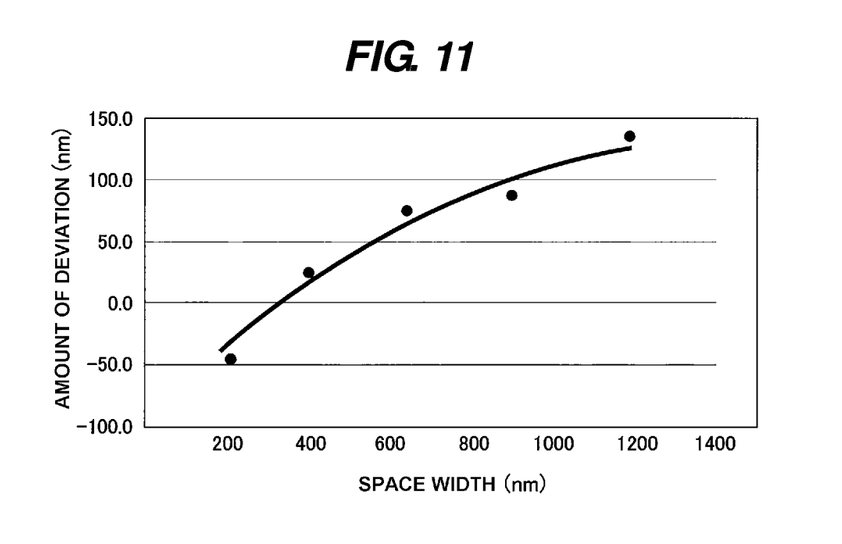
FIG. 11 is a graph showing the correction line.

In step 13, the computer 150 generates the correction line from the plurality of temporary data points on the coordinate system. More specifically, the computer 150 performs a regression analysis on the plurality of temporary data points on the coordinate system to generate the correction line. FIG. 11 is a graph showing the correction line. This correction line is an approximate line representing the plurality of temporary data points. The correction line is a straight line or a curved line. Type of correction line generated is appropriately selected based on the type of the wafer pattern. For example, the correction line may be a straight line expressed by a linear function, or may be a curved line expressed by a quadratic function or a cubic function.

In step 14, the computer 150 determines whether or not a command to update the correction line has been received. The command is input to the computer 150 by a user. When receiving the command, the computer 150 sets a plurality of new data points based on the appearance-frequency graph. The specific operations are as follows.

In step 15, additional space widths are selected based on the appearance-frequency graph of FIG. 8. Each of the additional space widths to be selected is one of the plurality of space widths shown in the appearance-frequency graph, and is one whose appearance frequency is high to some degree. For example, a space width whose appearance frequency is higher than a threshold value is selected. Some or all of the additional space widths may be the same as or different from the space widths selected in the above-described step 8. For example, when the correction line generated in the step 13 is close to a straight line, it is expected that there is a data point where the amount of deviation does not change. In addition, by increasing the number of data points, it is expected that a more accurate correction line can be calculated and a variation in data or a strength of correlation can be determined. In such a case, a space width larger than the temporary maximum value of the space width selected in the step 8 may be selected. In one embodiment, only one additional space width may be selected in the step 15.

In step 16, the computer 150 selects, from the test area, a plurality of wafer patterns corresponding respectively to the plurality of additional space widths selected in the step 15. Further, the computer 150 instructs the scanning electron microscope 100 to generate images of the plurality of wafer patterns selected. The number of images generated is the same as the number of additional space widths. For example, if five space widths are selected in the step 15, any five wafer patterns corresponding to the space widths, respectively, are selected from within the test area, and five images of these five wafer patterns are generated by the scanning electron microscope 100. The computer 150 acquires the images of the wafer patterns from the scanning electron microscope 100.

In step 17, the computer 150 corrects, using the correction line, positions of edges of a plurality of reference patterns corresponding to the wafer patterns on the images obtained in the step 16. More specifically, positions of all edges of each reference pattern are corrected according to the space width and the corresponding amount of deviation indicated by the correction line. An amount of correction for the position of the edge corresponds to the amount of deviation determined from the correction line. The computer 150 corrects the positions of all edges of each reference pattern by moving the edges of the reference pattern by distances corresponding to the amounts of deviation determined from the correction line.

Figure 12:
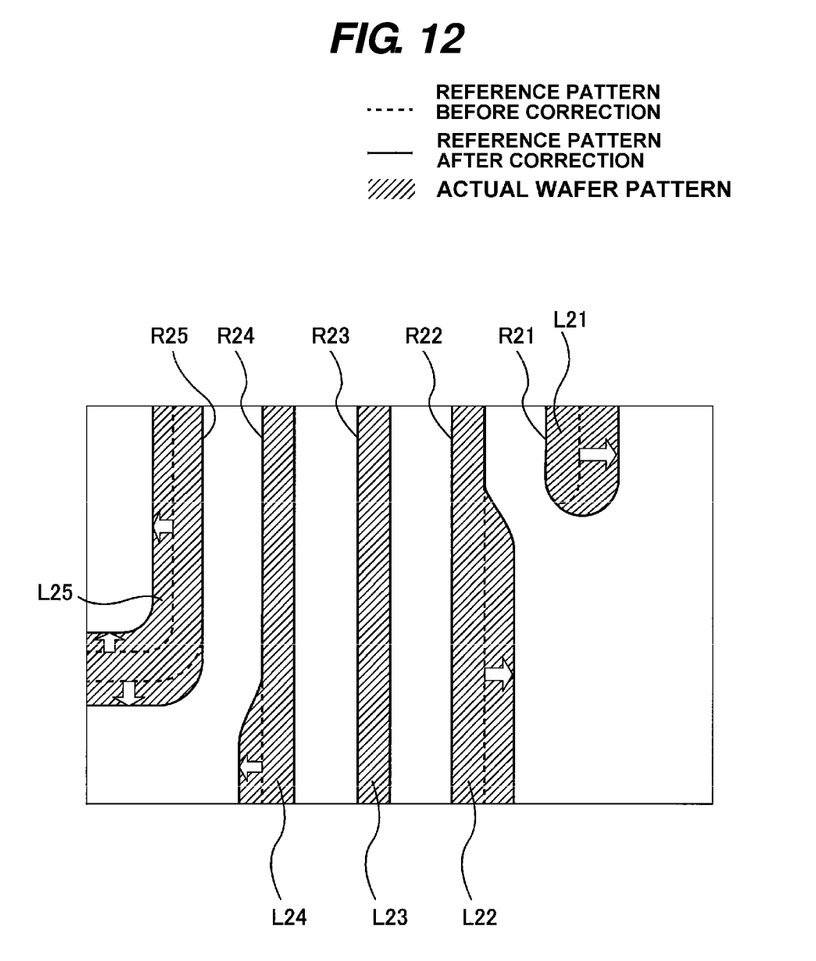
FIG. 12 is a diagram showing reference patterns with corrected edges.

FIG. 12 is a diagram illustrating reference patterns whose edges have been corrected. In FIG. 12, symbols L21, L22, L23, L24, and L25 represent wafer patterns, and symbols R21, R22, R23, R24, and R25 represent reference patterns corresponding to the wafer patterns L21, L22, L23, L24, and L25, respectively. In the example shown in FIG. 12, edges of the reference patterns R21, R22, R24, and R25 are corrected as indicated by white arrows.

In step 18, the computer 150 detects edges of the plurality of wafer patterns on the plurality of images acquired in the step 16 based on the plurality of corresponding reference patterns. Since the edge detection in the step 18 uses the reference patterns whose edge positions have been corrected in the step 17, the edge detection of the wafer patterns and the pattern matching between the reference patterns and the wafer patterns are expected to be performed more accurately.

In step 19, the computer 150 displays the detection result of the edges of the wafer patterns on the screen of the display device 164.

If the detection of an edge corresponding to the additional space width has failed in the step 18, the computer 150 may search for the edge of the wafer pattern while gradually moving the edge of the reference pattern. Alternatively, in order to achieve edge detection in a shorter time, the user may manipulate the graphical user interface (GUI) of the computer 150 to move the edge of the reference pattern on the screen until the edge of the reference pattern coincides with the edge of the wafer pattern. For example, the user may manipulate the mouse of the computer 150 to drag the edge of the reference pattern until it coincides with the edge of the wafer pattern.

In step 20, the computer 150 calculates a plurality of amounts of deviation with respect to the plurality of additional space widths, based on differences between the positions of the edges of the wafer patterns and the positions (initial positions) of the edges of the reference patterns before being corrected by the correction line.

Figure 13:
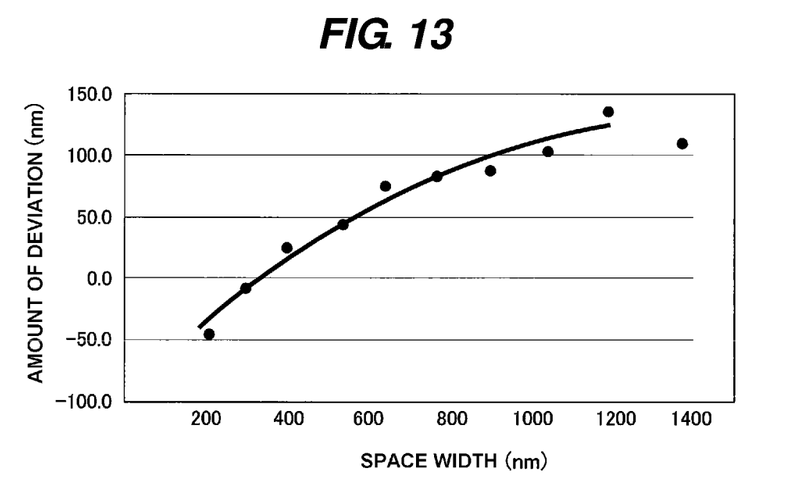
FIG. 13 is a graph showing temporary data points and new data points plotted on the coordinate system.

In step 21, the computer 150 plots, on the coordinate system, a plurality of new data points specified by the plurality of amounts of deviation calculated in the step 20 and the plurality of additional space widths. FIG. 13 is a graph showing the temporary data points and the new data points plotted on the coordinate system.

Figure 14:
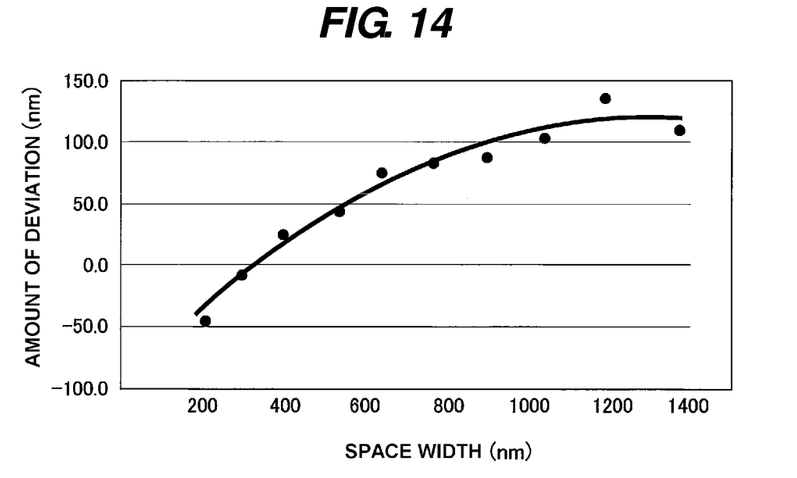
FIG. 14 is a schematic view showing an updated correction line.

In step 22, the computer 150 updates the correction line by performing a regression analysis on the temporary data points and the new data points on the coordinate system. FIG. 14 is a schematic diagram illustrating an updated correction line.

In step 23, the computer 150 determines whether or not a command to further update the correction line has been received. The command is input to the computer 150 by the user. When receiving the command, the computer 150 repeats the steps from the selection of the additional space widths in the step 15 to the update of the correction line in the step 22. In step 24, when there are no commands in the step 14 and the step 22, the computer 150 stores the correction line obtained in the step 22 in the memory 162. In step 25, the computer 150 corrects, with use of the correction line, positions of edges of reference patterns in the area specified by the base recipe. The correction of the edge positions is performed in the same manner as the processes shown in FIG. 12. In step 26, pattern defect inspection or pattern measurement is performed according to the base recipe.

As described above, the edge positions of the reference patterns are corrected closer to the edge positions of the wafer patterns, so that the edge detection algorithm or parameters, etc., which may lower the throughput, is not needed to change. As a result, the edge detection of wafer pattern and the pattern matching between the reference pattern and the wafer pattern are expected to be performed more accurately during the pattern defect detection or the pattern measurement.

Figure 15:
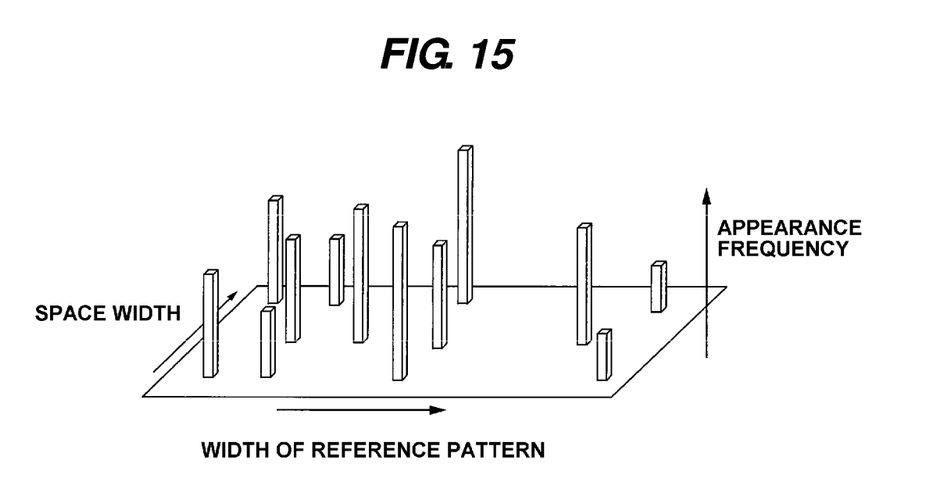
FIG. 15 is a graph showing another embodiment of an appearance-frequency graph.

FIG. 15 is a graph showing another embodiment of the appearance-frequency graph. The appearance-frequency graph of FIG. 15 is an appearance-frequency graph with respect to the space width and the width of the reference pattern. The appearance frequency of the space width is classified into a plurality of groups according to the width of the reference pattern. In the present embodiment, the above-described correction line is generated for each of the plurality of groups classified according to the width of the reference pattern. Specifically, in the present embodiment, a plurality of correction lines are generated for the plurality of groups, respectively, which have been classified according to the width of the reference pattern.

The amount of deviation between the edge of the wafer pattern and the edge of the reference pattern may vary depending not only on the space width described above but also on the width of the corresponding reference pattern itself. According to the present embodiment, the correction lines reflecting the widths of the reference patterns are generated. Therefore, edges of reference patterns having different widths can be accurately corrected based on the corresponding correction lines. As a result, the accuracy of edge detection of the wafer pattern and the pattern matching between the reference pattern and the wafer pattern can be improved.

The above-described method of generating the correction line(s) can be applied to not only a line pattern but also a hole pattern or an island pattern as well.

In the present specification, examples of an image of a wafer pattern include not only an image generated by the scanning electron microscope 100 in the above-described embodiments, but also a virtual image of the wafer pattern generated by simulation. Therefore, in one embodiment, in generating the above-described correction line(s), an image of a wafer pattern generated by simulation may be used instead of an image of a wafer pattern generated by the scanning electron microscope 100. For example, the computer 150 may acquire an image (or a virtual image) of a wafer pattern generated by a lithography simulation or a process simulation performed by an external computer (which may also be called a simulator), and the computer 150 may use this image of the wafer pattern to produce the correction line(s).

Figure 16:
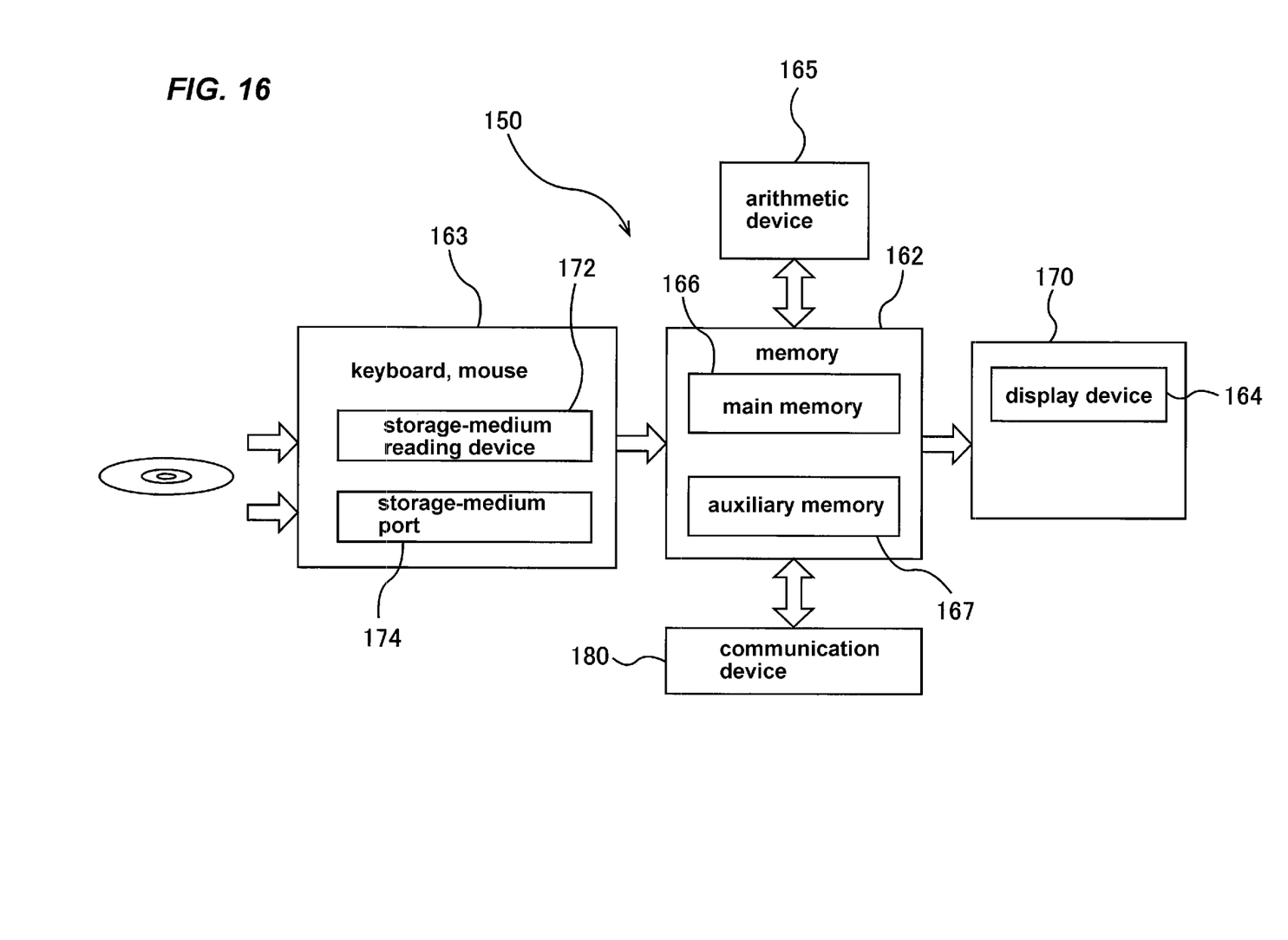
FIG. 16 is a schematic diagram showing a configuration of a computer.

FIG. 16 is a schematic diagram showing the configuration of the computer 150. The computer 150 is constituted by a dedicated computer or a general-purpose computer. The computer 150 includes the memory 162 in which programs and data are stored, an arithmetic device 165, such as CPU (Central Processing Unit) for performing arithmetic operations in accordance with the programs stored in the memory 162, an input device 163 for inputting the data, the programs, and various information into the memory 162, an output device 170 for outputting processing results and processed data, and a communication device 180 for connecting to a network.

The memory 162 includes a main memory 166 accessible by the arithmetic device 165, and an auxiliary memory 167 storing the data and the programs. The main memory 166 may be, for example, a random access memory (RAM), and the auxiliary memory 167 may be a storage device, such as a hard disk drive (HDD) or a solid state drive (SSD).

The input device 163 includes a keyboard and a mouse, and further includes a storage-medium reading device 172 for reading out data from a storage medium, and a storage-medium port 174 to which the storage medium is coupled. The storage medium is a non-transitory tangible computer-readable storage medium, which is, for example, an optical disk (e.g., CD-ROM, DVD-ROM) or a semiconductor memory (e.g., USB flash drive, memory card). Examples of the storage-medium reading device 172 include an optical drive (e.g., CD drive, DVD drive) and a card reader. An example of the storage-medium port 174 is a USB terminal. Programs and/or data stored in the storage medium are introduced into the computer 150 via the input device 163, and are stored in the auxiliary memory 167 of the memory 162. The output device 170 includes the display device 164.

The computer 150 operates according to a program electrically stored in the memory 162. The program for causing the computer 150 to perform the operations shown in the flowcharts of FIGS. 6 and 7 is stored in a non-transitory tangible computer-readable storage medium, and is provided to the computer 150 via the storage medium. Alternatively, the program may be provided to the computer 150 via a communication network.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention can be applicable to a method and an apparatus for generating a correction line indicating a relationship between an amount of deviation of an edge of a wafer pattern from an edge of a reference pattern and a width of a space adjacent to the edge of the reference pattern.

REFERENCE SIGNS LIST 100 scanning electron microscope
111 electron gun
112 converging lens
113 X deflector
114 Y deflector
115 objective lens
116 lens controller
117 deflection controller
118 image acquisition device
120 specimen chamber
121 XY stage
122 stage controller
124 wafer
130 secondary electron detector
131 backscattered electron detector
140 wafer transporting device
150 computer
161 design database
162 memory
163 input device
164 display device

The invention claimed is:

1. A method of generating a correction line indicating a relationship between an amount of deviation of an edge of a wafer pattern from an edge of a reference pattern and a width of a space adjacent to the edge of the reference pattern, comprising:
  creating an appearance-frequency graph with respect to widths of spaces adjacent to reference patterns located within a designated area;
  obtaining images of wafer patterns corresponding to a plurality of space widths shown in the appearance-frequency graph;
  calculating amounts of deviation between edges of the wafer patterns on the images and edges of corresponding reference patterns;
  plotting a plurality of temporary data points on a coordinate system, the plurality of temporary data points being specified by the plurality of space widths and the amounts of deviation;
  generating a correction line from the plurality of temporary data points on the coordinate system;
  obtaining an image of an additional wafer pattern corresponding to at least one additional space width shown in the appearance-frequency graph;
  correcting a position of an edge of a reference pattern corresponding to the additional wafer pattern using the correction line;
  detecting an edge of the additional wafer pattern on the image based on the reference pattern whose position of the edge has been corrected;
  calculating an amount of deviation between the detected edge and the edge of the reference pattern before the correction;
  plotting a new data point on the coordinate system, the new data point being specified by the additional space width and the amount of deviation of the detected edge; and
  updating the correction line from the plurality of temporary data points and the new data point.

2. The method according to claim 1, further comprising repeating plotting of the new data point on the coordinate system and updating of the correction line.

* * * * *